United States Patent
Huang et al.

(10) Patent No.: US 9,166,843 B2
(45) Date of Patent: Oct. 20, 2015

(54) DIGITAL PULSE WIDTH GENERATOR AND METHOD FOR GENERATING DIGITAL PULSE WIDTH

(71) Applicant: Industrial Technology Research Institute, Chutung, Hsinchu (TW)

(72) Inventors: Chao-Jen Huang, Hsinchu (TW); Ya-Ting Chang, Hsinchu (TW); Ke-Horng Chen, Hsinchu (TW)

(73) Assignee: INDUSTRIAL TECHNOLOGY RESEARCH INSTITUTE, Hsinchu County (TW)

( * ) Notice: Subject to any disclaimer, the term of this patent is extended or adjusted under 35 U.S.C. 154(b) by 64 days.

(21) Appl. No.: 14/062,666

(22) Filed: Oct. 24, 2013

(65) Prior Publication Data
US 2015/0049799 A1    Feb. 19, 2015

(30) Foreign Application Priority Data

Aug. 14, 2013    (TW) .............................. 102129100 A

(51) Int. Cl.
*H03D 3/24* (2006.01)
*H04L 27/06* (2006.01)
*H04L 25/49* (2006.01)

(52) U.S. Cl.
CPC .................. *H04L 25/4902* (2013.01)

(58) Field of Classification Search
USPC ......... 375/219, 220, 222, 295, 302, 306, 307, 375/316, 324, 346, 347, 350, 354, 362, 373, 375/375, 376, 341, 338, 339, 340
See application file for complete search history.

(56) References Cited

U.S. PATENT DOCUMENTS

| | | | |
|---|---|---|---|
| 5,838,899 A | 11/1998 | Leavitt et al. | |
| 5,990,923 A | 11/1999 | Morrison | |
| 6,031,886 A * | 2/2000 | Nah et al. ...................... | 375/375 |
| 6,044,113 A | 3/2000 | Oltean | |
| 6,507,167 B2 | 1/2003 | Han et al. | |

(Continued)

FOREIGN PATENT DOCUMENTS

| | | |
|---|---|---|
| CA | 2152799 A1 | 9/1994 |
| CN | 101019317 A | 8/2007 |

(Continued)

OTHER PUBLICATIONS

Foong et al, "A Supply and Process-Insensitive 12-Bit DPWM for Digital DC-DC Converters," IEEE International Midwest Symposium on Circuits and Systems (MWSCAS), 2009, p. 929-932.

(Continued)

*Primary Examiner* — Linda Wong
(74) *Attorney, Agent, or Firm* — Muncy, Geissler, Olds & Lowe, P.C.

(57) ABSTRACT

A digital pulse width generator and a method for generating a digital pulse width are provided. The method for generating a digital pulse width includes the following. Generating a first period according to first set of bits of pulse data. The first period includes an interval. First phase signals are set to a first logic value in the interval and are generated according to first phase clock signals after an end of the interval. Second phase signals are set to the first logic value in the first period and are generated according to second phase clock signals after an end of the first period. Selecting a first signal from the first phase signals and the second phase signals according to second set of bits of the pulse data as a pulse width signal.

20 Claims, 12 Drawing Sheets

(56) References Cited

U.S. PATENT DOCUMENTS

| | | | |
|---|---|---|---|
| 7,002,325 B2 | 2/2006 | Harris et al. | |
| 7,057,379 B2 | 6/2006 | Chapuis | |
| 7,227,476 B1 | 6/2007 | Wong | |
| 7,323,919 B2 | 1/2008 | Yang et al. | |
| 7,376,182 B2 | 5/2008 | Kris | |
| 7,449,915 B2 * | 11/2008 | Schmit et al. | 326/38 |
| 7,459,951 B2 | 12/2008 | Prodic | |
| 7,466,176 B2 | 12/2008 | Huard et al. | |
| 7,528,640 B2 | 5/2009 | Huang et al. | |
| 7,643,580 B2 * | 1/2010 | Nelson | 375/327 |
| 7,714,626 B2 | 5/2010 | Kris | |
| 7,821,431 B2 | 10/2010 | Prodic et al. | |
| 7,848,406 B2 | 12/2010 | O'Mally et al. | |
| 7,852,642 B2 | 12/2010 | Yu | |
| 7,907,664 B2 | 3/2011 | Song et al. | |
| 7,915,938 B2 | 3/2011 | Iozsef et al. | |
| 7,977,904 B2 | 7/2011 | Berman et al. | |
| 7,977,994 B2 | 7/2011 | Yousefzadeh et al. | |
| 8,044,742 B2 * | 10/2011 | Sun | 332/103 |
| 8,058,932 B2 | 11/2011 | Liu et al. | |
| 8,120,401 B2 | 2/2012 | Kenly et al. | |
| 8,125,287 B2 | 2/2012 | Lukic et al. | |
| 8,140,870 B2 | 3/2012 | Hopkins | |
| 8,183,902 B2 | 5/2012 | Kenly et al. | |
| 8,185,774 B2 | 5/2012 | Diewald et al. | |
| RE43,489 E | 6/2012 | Andersen et al. | |
| 8,207,773 B2 | 6/2012 | Crofts | |
| RE43,946 E | 1/2013 | Sase et al. | |
| 8,396,111 B2 | 3/2013 | O'Mally et al. | |
| 2004/0174286 A1 | 9/2004 | Donovan et al. | |
| 2005/0146366 A1 | 7/2005 | Steinschaden | |
| 2007/0195876 A1 | 8/2007 | Prodic | |
| 2009/0066382 A1 | 3/2009 | Yousefzadeh et al. | |
| 2010/0002822 A1 * | 1/2010 | Arima et al. | 375/371 |
| 2010/0061442 A1 | 3/2010 | O'Mally et al. | |
| 2012/0114076 A1 * | 5/2012 | Morton et al. | 375/308 |
| 2012/0242314 A1 | 9/2012 | Namekawa et al. | |
| 2013/0021057 A1 * | 1/2013 | Schmit et al. | 326/38 |
| 2013/0326257 A1 * | 12/2013 | Fujimoto | 713/400 |

FOREIGN PATENT DOCUMENTS

| | | |
|---|---|---|
| CN | 100397280 C | 6/2008 |
| CN | 101090272 B | 6/2011 |
| CN | 102739209 A | 10/2012 |
| CN | 101548167 B | 11/2012 |
| CN | 102832914 A | 12/2012 |
| EP | 0 421 712 A2 | 4/1991 |
| EP | 0 681 362 B1 | 10/1998 |
| GB | 682648 | 11/1952 |
| GB | 2 219 659 A | 12/1989 |
| JP | 62-45217 A | 2/1987 |
| JP | 64-20718 A | 1/1989 |
| JP | 11-146677 A | 5/1999 |
| JP | 3326890 B2 | 9/2002 |
| JP | 2006-109688 A | 4/2006 |
| JP | 4820667 B2 | 11/2011 |
| TW | 222727 | 4/1994 |
| TW | 259906 | 10/1995 |
| TW | 567675 | 12/2003 |
| TW | I264179 B | 10/2006 |
| TW | 200826450 | 6/2008 |
| TW | 200826503 | 6/2008 |
| TW | 200901609 | 1/2009 |
| TW | I320264 B | 2/2010 |
| TW | 201025865 A1 | 7/2010 |
| TW | I331854 B | 10/2010 |
| TW | I355143 B | 12/2011 |
| TW | I357205 B | 1/2012 |
| TW | I358694 B | 2/2012 |
| TW | I377769 B | 11/2012 |
| WO | WO 95/14906 A2 | 6/1995 |
| WO | WO 2004/055964 A1 | 7/2004 |

OTHER PUBLICATIONS

Gao et al, "FPGA-Based DPWM for Digitally Control High-Frequency DC-DC SMPS," International Conference on Power Electronics Systems and Applications (PESA), 2009; 7 pages.

Ge et al, "Design and Implementation of a High Resolution DPWM Based on a Low-Cost FPGA," IEEE, 2010, p. 2306-2311.

Guo et al, "High-Resolution Digital PWM Controller for High-Frequency Low-Power SMPS," European Conference on Power Electronics and Applications (EPE); 2009; 9 pages.

Haridy, "Synthesizable Delay Line Architectures for Digitally Controlled Voltage Regulators," Thesis submitted to the Electrical Engineering Department at the American University in Cairo; 2012, 81 pages.

Hmood, "Design and Implementation of a High Resolution Two Counter Digital Pulse Width Modulation," Eng. & Tech. Journal, 2009; p. 1260-1269, vol. 27, No. 7.

Hung et al, "Delay-Line Sharing Based: A New CMOS Digital PWM Circuit," IEEE International Symposium on Computer, Consumer and Control, 2012, p. 305-308.

Kannan, "Digital Synthetic Ripple Modulator for a DC-DC Converter," Doctorial thesis submitted to the University of Florida, 2006, 170 pages.

Lukic et al, "Universal and Fault-Tolerant Multiphase Digital PWM Controller IC for High-Frequency DC-DC Converters," IEEE Applied Power Electronics Conference (SPEC), 2007; p. 42-47.

Peterchev, "Digital Pulse-Width Modulation Control in Power Electronic Circuits: Theory and Applications," Doctorial thesis submitted to the University of California, Berkley, 2005, 172 pages.

Scharrer, "Enhancements for Digital Control of Switch Mode Power Supplies: Bi-directional Data-Links, State Dependent ADC Encoding and Advanced Digital Pulse Width Modulation Schemes," Doctorial thesis submitted to the University of Limerick, 2012, 271 pages.

Syed et al, "Digital Pulse Width Modulator Architectures," ; 35th Annual IEEE Power Electronics Specialists Conference (PESC), 2004, p. 4689-4695.

Syed, "Digital PWM Controller with Feed-Forward Compensation," IEEE Applied Power Electronics Conference and Exposition (APEC), 2004, p. 60-66.

Takayama, "High frequency digitally controlled monolithic step-down DC-DC converters," Thesis submitted to the Faculty of the Graduate School of the University of Colorado, 2006, 181 pages.

Utter et al, "Design and implementation of a high-resolution, high-efficiency optical Spectrometer," Review of Scientific Instruments, 2002, p. 3737-3741, vol. 73, No. 11.

Wang, "Improved delay-line based digital PWM for DC-DC converters," Electronics Letters, 2011, 2 pages, vol. 47, No. 9.

Yang et al, "Synthesizable Wide Range DPWM with All-Digital PLL for Digitally-Controlled Switching Converter," IEEE Industrial Electronics Society (IECON), 2011, p. 1626-1630.

Yousefzadeh et al, "Hybrid DPWM with Digital Delay-Locked Loop," IEEE Workshop on Computers in Power Electronics (COMPEL), 2006, p. 142-148.

Zhang et al, "Advanced Pulse Width Modulation Controller ICs for Buck DC-DC Converters," Doctorial thesis submitted to the University of California, Berkeley, 2006, 128 pages.

\* cited by examiner

DIGITAL PULSE WIDTH GENERATOR AND METHOD FOR GENERATING DIGITAL PULSE WIDTH

CROSS-REFERENCE TO RELATED APPLICATION

The application is based on and claims priority to Taiwanese Patent Application No. 102129100, filed on Aug. 14, 2013. The entirety of the above-mentioned patent application is hereby incorporated by reference herein and made a part of this specification.

TECHNICAL FIELD

The technical field relates to a pulse width signal generator and method for generating a pulse width signal.

BACKGROUND

Pulse width modulation (PWM) is widely used. PWM may meet the circuit specification by switching and may be used in the field such as biomedical technology, industry, science, smart grid, etc. Pulse width generators are generally implemented using analog circuits. However, most analog pulse width generators have large area and long response time. In addition, analog circuits may need to be re-designed for different fabrication processes. Thus, it is the trend to develop pulse width generators implemented with digital circuits.

SUMMARY

The disclosure provides a digital pulse width generator and a method for generating a digital pulse width, by which a digital pulse width signal is generated.

The disclosure provides a method for generating a digital pulse width. The method includes generating a first period according to first set of bits of pulse data, wherein the first period comprises an interval, a plurality of first phase signals are set to a first logic value in the interval, the first phase signals are generated according to a plurality of first phase clock signals after an end of the interval, a plurality of second phase signals are set to the first logic value in the first period, the second phase signals are generated according to a plurality of second phase clock signals after an end of the first period, the interval starts at the same time as the first period, the interval ends earlier than the first period, and the first phase clock signals have different phases from the second phase clock signals; and selecting a first signal from the first phase signals and the second phase signals according to second set of bits of the pulse data as a pulse width signal.

The disclosure provides a digital pulse width generator. The digital pulse width generator includes a phase control circuit and a phase select circuit. The phase control circuit is capable of receiving first set of bits of pulse data to generate a first period, a plurality of first phase signals, and a plurality of second phase signals. The first period comprises an interval. The first phase signals are set to a first logic value in the interval, and the first phase signals are generated according to a plurality of first phase clock signals after an end of the interval. The second phase signals are set to the first logic value in the first period, and the second phase signals are generated according to a plurality of second phase clock signals after an end of the first period. The interval starts at the same time as the first period, and the interval ends earlier than the first period. The first phase clock signals have different phases from the second phase clock signals. A phase select circuit is coupled to the phase control circuit and is capable of receiving the first phase signals, the second phase signals, and the second set of bits of the pulse data to select a first signal from the first phase signals and the second phase signals according to the second set of bits of the pulse data as a pulse width signal.

Accordingly, the embodiments of the disclosure provide a digital pulse width generator and a method for generating a digital pulse width signal, by which a digital pulse width signal with high resolution and high linearity may be generated. Several embodiments accompanied with figures are described below for further understandings.

BRIEF DESCRIPTION OF THE DRAWINGS

The present disclosure can be more fully understood by reading the following detailed description of the embodiments, with reference made to the accompanying drawings, wherein.

DETAILED DESCRIPTION OF DISCLOSED EMBODIMENTS

The term "couple" or "coupled" used in the disclosure and the claims may refer to any direct or indirect connection. For example, when describing a first device coupled to a second device, the first device may be connected to the second device directly, or the first device may be connected to the second device indirectly through any other devices, methods, or connection techniques.

Figure 1:
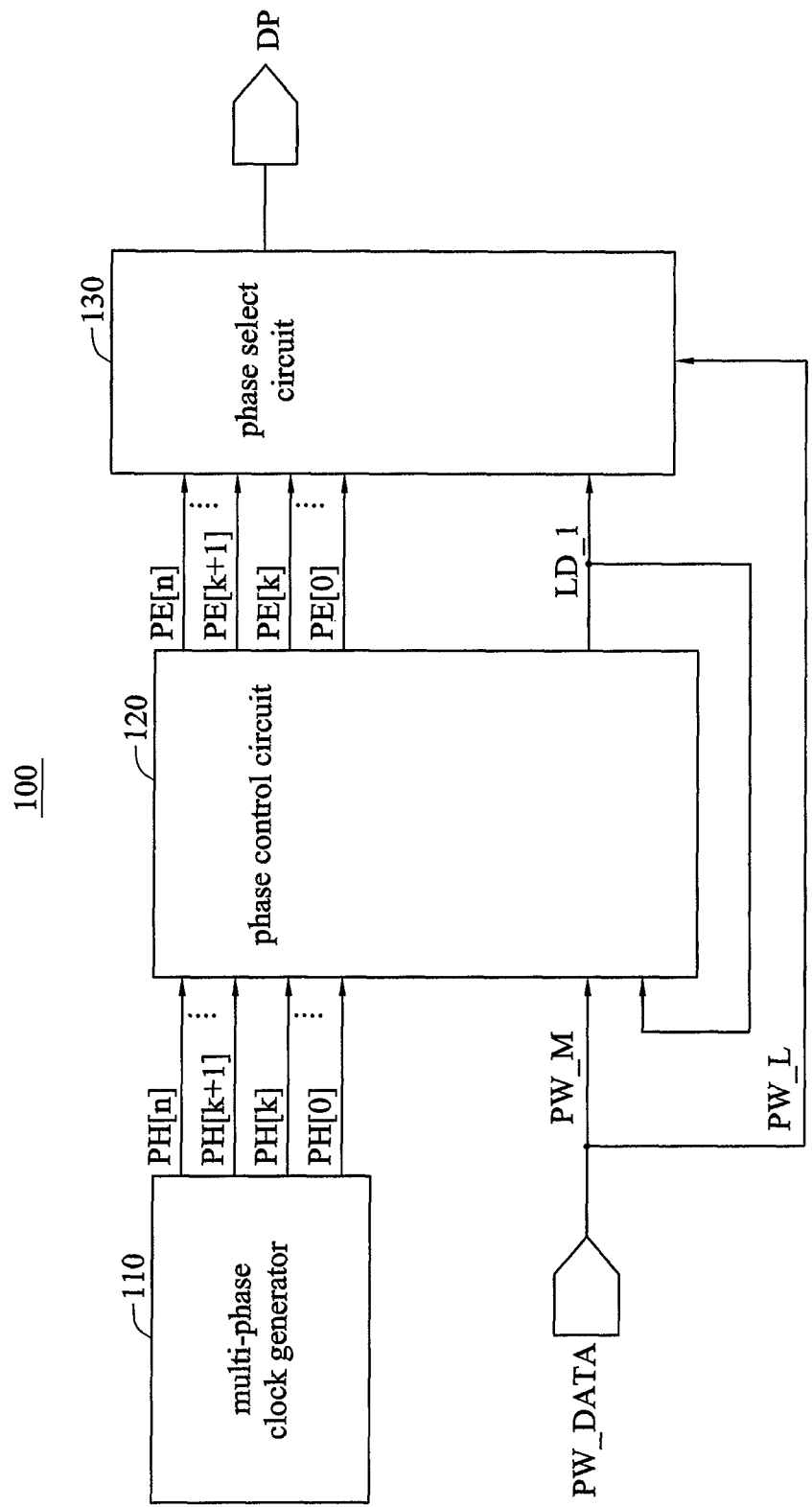
FIG. 1 is a circuit block diagram of a digital pulse width generator in accordance with an embodiment of the disclosure.

FIG. 1 is a circuit block diagram of a digital pulse width generator 100 in accordance with an embodiment of the disclosure. As shown in FIG. 1, a digital pulse width generator 100 may be a pattern generator, and may be, but not limited to be, implemented with digital circuits. The digital pulse width generator 100 includes a multi-phase clock generator 110, a phase control circuit 120, and a phase select circuit 130. The phase control circuit 120 is coupled to the multi-phase clock generator 110 and the phase select circuit 130, respectively. The multi-phase clock generator 110 generates a plurality of phase clock signals PH[0]~PH[n]. The phase clock signals PH[0]~PH[n] are in different phases, that is to say, the phase of phase clock signal PH[0] and the phase of phase clock signal PH[1] are different, and so on. Periods of clock cycle of the phase clock signals PH[0]~PH[n] may be the same. First phase clock signals PH[0]~PH[k] and second phase clock signals PH[k+1]~PH[n] are input to the phase control circuit 120. The phase control circuit 120 generates the phase signals PE[0]~PE[n] according to first set of bits PW_M of pulse data PW_DATA. The first phase signals PE[0]~PE[k] and the second phase signals PE[k+1]~PE[n] are input to the phase select circuit 130, wherein n is a positive integer, and k is a positive integer which is smaller than n. The phase select circuit 130 selects a first signal (not shown) as a pulse width signal DP, wherein the selection is performed according to a second set of bits PW_L of the pulse data PW_DATA and the first signal is selected from the phase signals PE[0]~PE[n].

In this embodiment, the first set of bits PW_M of the pulse data PW_DATA may be most significant bits (MSB), and the second set of bits PW_L of the pulse data PW_DATA may be least significant bits (LSB), but this disclosure is not limited to this embodiment. In another embodiment, the first set of bits PW_M of the pulse data PW_DATA may be least significant bits, and the second set of bits PW_L of the pulse data PW_DATA may be most significant bits. The first set of bits PW_M may have the same number of bits as or have different number of bits from the second set of bits PW_L. For example, the pulse data PW_DATA include 8 bits with a group of 4 most significant bits and a group of 4 least significant bits, and thus the first set of bits PW_M of the pulse data PW_DATA may belong to one of the group of MSB and the group of LSB while the second set of bits PW_L may belong to the other one of the group of MSB and the group of LSB.

Figure 2:
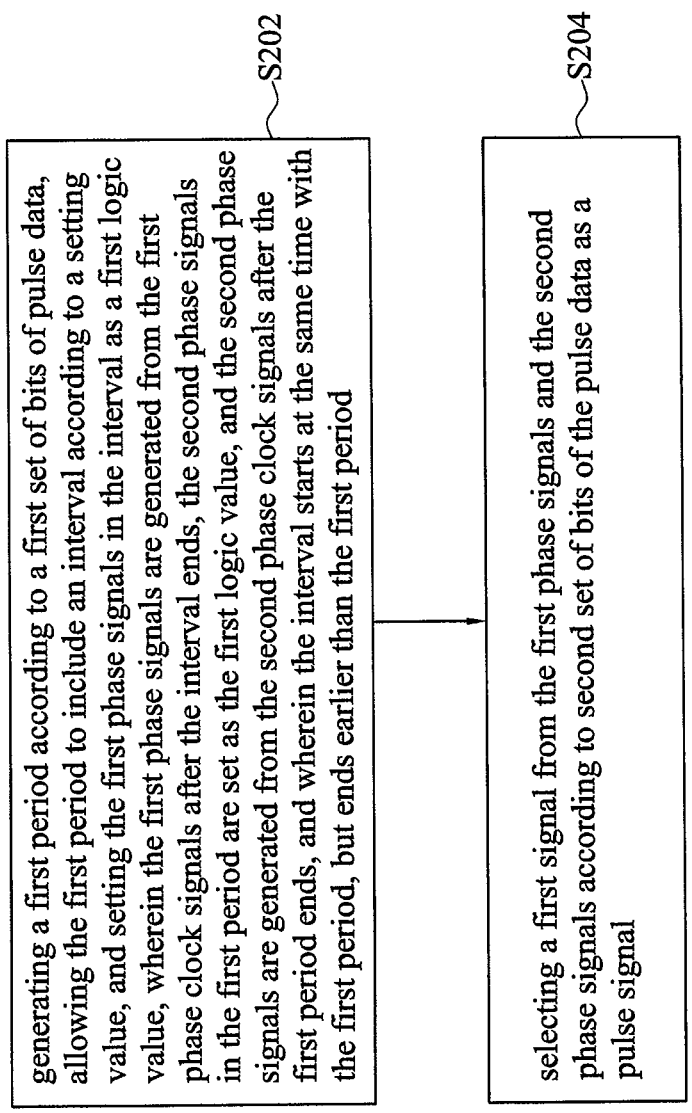
FIG. 2 is a flow chart showing a method for generating a digital pulse width in accordance with an embodiment of the disclosure.

FIG. 2 is a flow chart showing a method for generating a digital pulse width in accordance with an embodiment. FIG. 1 may be also referred to with the description of FIG. 2. In step S202, the phase control circuit 120 generates a first period according to the first set of bits PW_M of the pulse data PW_DATA, and the first period comprises an interval according to a setting value m (not shown). The first phase signals PE[0]~PE[k] are set to a first logic value in the interval and generated according to the first phase clock signals PH[0]~PH[k] after an end time of the interval. The second phase signals PE[k+1]~PE[n] are set to the first logic value in the first period and generated according to the second phase clock signals PH[k+1]~PH[n] after an end time of the first period. The interval starts at the same time as the first period, and the interval ends earlier than the first period. In step S204, the phase select circuit 130 selects the first signal from the first phase signals PE[0]~PE[k] and the second phase signals PE[k+1]~PE[n] according to the second set of bits PW_L of the pulse data PW_DATA as the pulse width signal DP. In this embodiment, the first logic value may be logic high or logic low.

It is noted that although step S202 in FIG. 2 is processed earlier than step S204, but this order is not used to limit the disclosure. In another embodiment, the phase select circuit 130 may select the first signal from the first phase signals PE[0]~PE[k] and the second phase signals PE[k+1]~PE[n] according to the second set of bits PW_L of the pulse data PW_DATA earlier, that is to say, step S204 may be processed earlier than step S202. In another embodiment, step S202 and step S204 may be processed at the same time.

Figure 3:
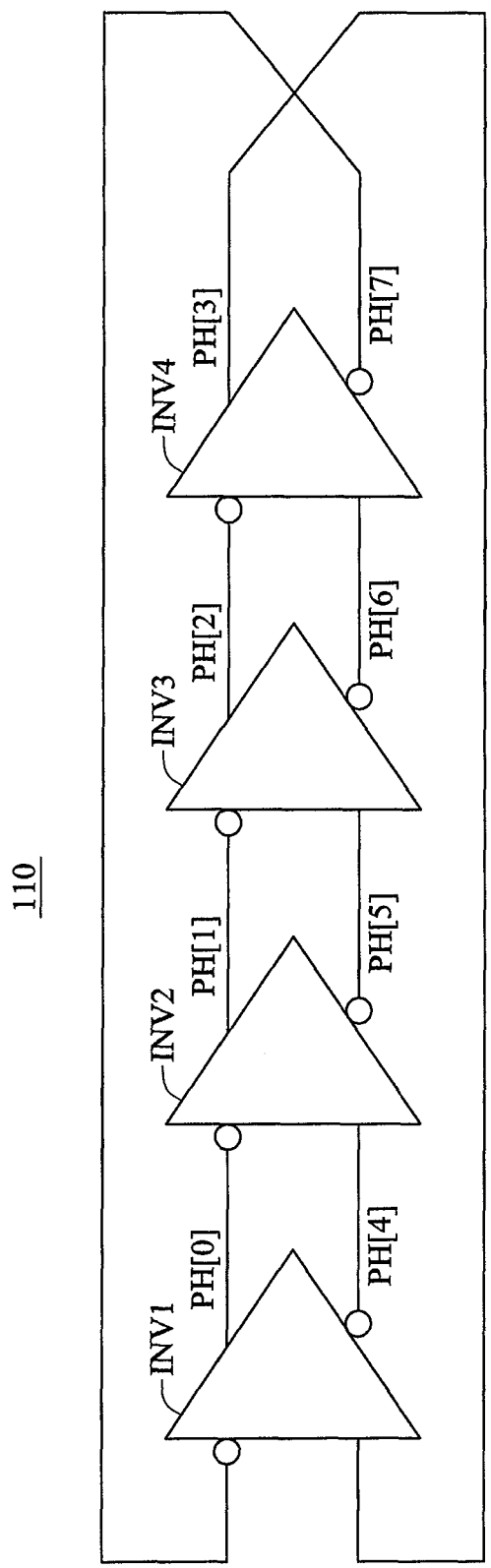
FIG. 3 is a circuit block diagram of the multi-phase clock generator in accordance with FIG. 1 of the disclosure.

FIG. 3 is a circuit block diagram of the multi-phase clock generator 110 in accordance with FIG. 1 of the disclosure. The multi-phase clock generator 110 may be a ring oscillator. The multi-phase clock generator 110 may generate the phase clock signals PH[0]~PH[n] with a plurality of differential invertors coupled to each other. For example, in this embodiment, differential invertors INV1~INV4 are coupled to each other and generate phase clock signals PH[0]~PH[7]. A non-inverting output port of the differential invertor INV1 is coupled to an inverting input port of the differential invertor INV2, and the phase clock signal PH[0] is output from the differential invertor INV1. An inverting output port of the differential invertor INV1 is coupled to a non-inverting input port of the differential invertor INV2, and the phase clock signal PH[4] is output from the differential invertor INV1. The connection of the differential invertor INV2 and the differential invertor INV3 is similar to the above. A non-inverting output port of the differential invertor INV4 is coupled to a non-inverting input port of the differential invertor INV1, and the phase clock signal PH[3] is output from differential invertor INV4. An inverting output port of the differential invertor INV4 is coupled to an inverting input port of the differential invertor INV1, and the phase clock signal PH[7] is output from differential invertor INV4.

Figure 4:
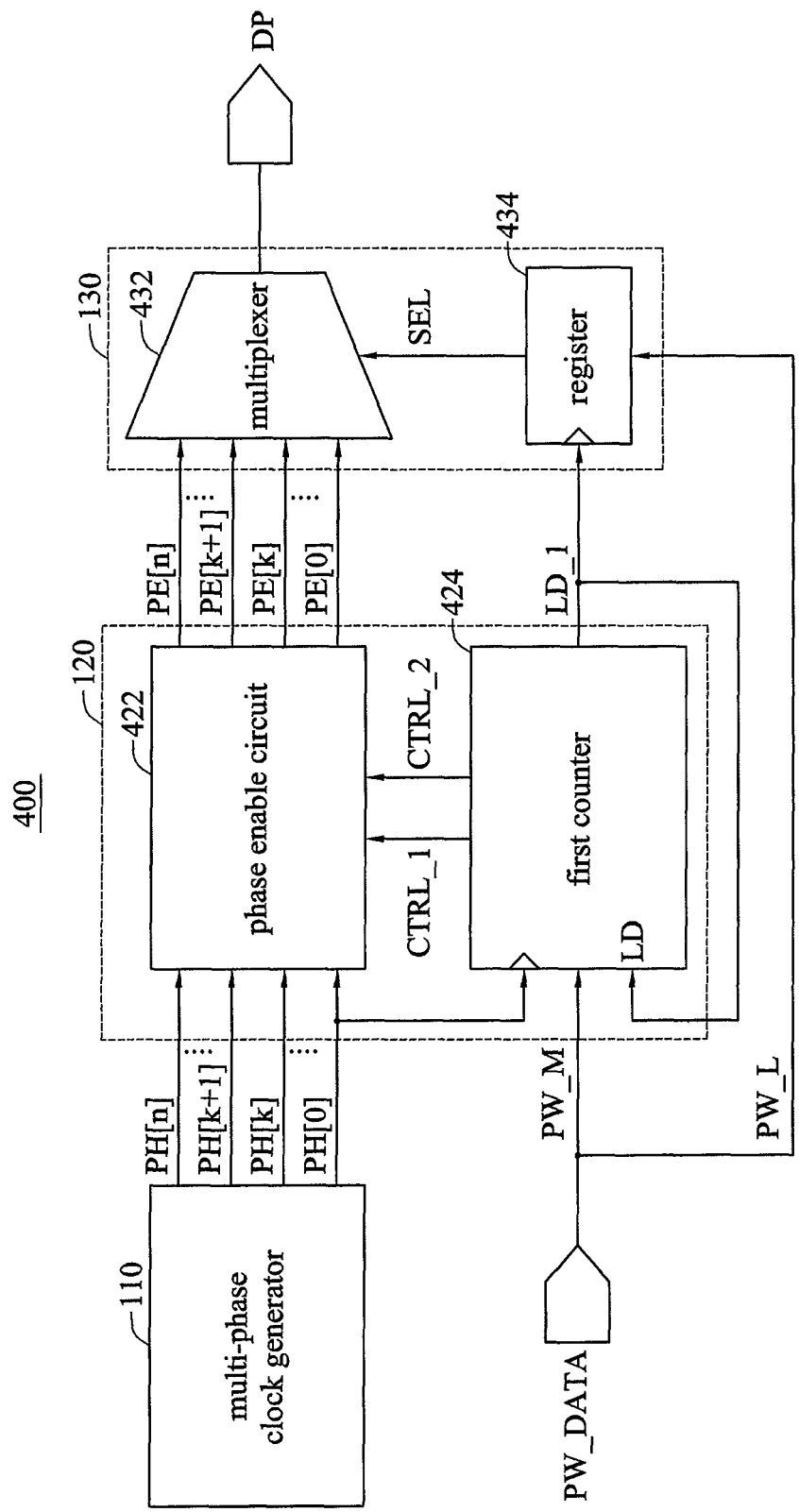
FIG. 4 is a circuit block diagram of the digital pulse width generator in accordance with another embodiment of the disclosure.

FIG. 4 is a circuit block diagram of the digital pulse width generator 400 in accordance with another embodiment of the disclosure. The digital pulse width generator 400 may be a pattern generator, and the related description of the digital pulse width generator 400 is similar to the description of the digital pulse width generator 100. As shown in FIG. 4, in this embodiment, the phase control circuit 120 includes a phase enable circuit 422 and a first counter 424 while the phase select circuit 130 includes a multiplexer (MUX) 432 and a register 434.

In this embodiment, the phase enable circuit 422 is coupled to the multi-phase clock generator 110, a first counter 424, and the MUX 432. The phase enable circuit 422 receives the phase clock signals PH[0]~PH[n] which are generated by the multi-phase clock generator 110, and receives a first control signal CTRL_1 and a second control signal CTRL_2 which are generated by the first counter 424 to generate the phase signals PE[0]~PE[n]. In an embodiment, when the first control signal CTRL_1 is logic low (CTRL_1=0), the first phase signals PE[0]~PE[k] are also logic low. When the first control signal CTRL_1 is logic high (CTRL_1=1), the first phase signals PE[0]~PE[k] are generated according to the first phase clock signals PH[0]~PH[k]. Similarly, when the second control signal CTRL_2 is logic low (CTRL_2=0), the second phase signals PE[k+1]~PE[n] are also logic low. When the second control signal CTRL_2 is logic high (CTRL_2=1), the second phase signals PE[k+1]~PE[n] are generated according to the second phase clock signals PE[k+1]~PE[n]. In another embodiment, however, when the first control signal CTRL_1 is logic high, first phase signals PE[0]~PE[k] are logic low. When the first control signal CTRL_1 is logic low, the first phase signals PE[0]~PE[k] are generated according to first phase clock signals PH[0]~PH[k]. In still another embodiment, when the first control signal CTRL_1 is the first logic value, the first phase signals PE[0]~PE[k] are either one of first logic value and second logic value. When the first control signal CTRL_1 is the second logic value, the first phase signals PE[0]~PE[k] are generated according to first phase clock signals PH[0]~PH[k]. The first logic value and second logic value may be either logic high or logic low. However, the first logic value and the second logic value are different. The generation of the second phase signals PE[k+1]~PE[n] may be similar to the generation of the first phase signals PE[0]~PE[k].

In this embodiment, the phase signals PE[0]~PE[n] include two groups, which are the group of the phase signals PE[0]~PE[n] and the group of second phase signals PE[k+1]~PE[n]. The group of the phase signals PE[0]~PE[n] are controlled by the first control signal CTRL_1 while the group of the second phase signals PE[k+1]~PE[n] are controlled by the second control signal CTRL_2. However, the disclosure is not limited to the above. In another embodiment, the phase signals PE[0]~PE[n] may include three or more groups. For example, the phase signals PE[0]~PE[n] include three groups. A fourth phase signals PE[0]~PE[m], a fifth phase signals PE[m+1]~PE[r], and the sixth phase signals PE[r+1]~PE[n] are controlled by a fourth control signal CTRL_4, a fifth control signal CTRL_5, and a sixth control signal CTRL_6, respectively. When the fourth control signal CTRL_4 is logic low, the fourth phase signals PE[0]~PE[m] are logic low. When the fourth control signal CTRL_4 is logic high, the fourth phase signals PE[0]~PE[m] are generated according to the fourth phase clock signals PH[0]~PH[m]. The behaviors of the fifth phase signals PE[m+1]~PE[r] and the sixth phase signal PE[r+1]~PE[n] are similar with the behavior of the fourth phase signals PH[0]~PH[m] and are not described herein.

The first counter 424 is coupled to the multi-phase clock generator 110, the phase enable circuit 422, and the register 434. The phase clock signal PH[0] of the multi-phase clock generator 110 is input to the first counter 424 as a clock signal for counting. The first counter 424 loads the first set of bits PW_M of the pulse data PW_DATA according to a first load signal LD_1, such that both the first control signal CTRL_1 and the second control signal CTRL_2 are first logic value (for example, logic low). At this time, the first control signal CTRL_1 and the second control signal CTRL_2 are disabled. Then, the first counter 424 starts to count from the value of the first set of bits PW_M according to the phase clock signal PH[0]. The time may be the start time of the first period and the start time of the interval described in FIG. 2. The value of the first counter 424 is subtracted by 1 with every clock cycle. When the value of the first counter 424 is the setting value m, the first control signal CTRL_1 is set to the second logic value (for example, logic high). At this time, the first control signal CTRL_1 is enabled, and the time may be the end time of the interval. Then, the first counter 424 continues to count down to zero, such that the second control signal CTRL_2 is the second logic value. At this time, the second control signal CTRL_2 is enabled, and the time may be the end time of the first period. The first counter 424 also generates the first load signal LD_1 to load a next value of the first set of bits PW_M of the pulse data PW_DATA into the first counter 424 and to output the first load signal LD_1 to the register 434. Moreover, after the first counter 424 counts to zero, all of the phase signals PE[0]~PE[n] generated by the phase enable circuit 422 would be changed from the first logic value to the second logic value according to the phase clock signals PH[0]~PH[n] within one clock period of the phase clock signal PH[0]. The setting value m may be a fixed value in the counter, a input value, or a value of a memory element (for example, a register) which may be configured in a first counter 424. In this embodiment, the setting value m is 1. The first control CTRL_1 and the second control signal CTRL_2 may be generated by the counting bits of the first counter 424. For example, the first counter 424 is a counter with 6 bits, wherein the bit are b5~b0 respectively. The first control signal CTRL_1 may be generated by logic anding bits b5~b1 with AND gates while the second control signal CTRL_2 may be generated by logic anding bits b5~b0 with AND gates. However, the disclosure is not limited to the above.

In this embodiment the first counter 424 counts down to 0 from first set of bits PW_M. However, it is not to limit the disclosure. In another embodiment, the first counter 424 counts up from 0 to the first set of bits PW_M. The first counter 424 may also count down or count up from a specific value to the first set of bits PW_M plus or subtract another specific value. In still another embodiment, the first counter 424 adds or subtracts by i with every clock cycle, wherein i is a positive integer. It is noted that the clock signal for the first counter 424 to count is not required to be the phase clock signal PH[0]. The clock signal may also be one of the phase clock signals PH[1]~PH[n].

The register 434 is coupled to the first counter 424 and MUX 432 and stores the second set of bits PW_L of the pulse data PW_DATA into the register 434 according to the first load signal LD_1. Thus, the register outputs a selecting signal SEL to MUX 432. The register 434 may be one or more flip-flops, one or more latches, or a part of a register bank. In another embodiment, the register 434 may be other memory elements. For example, the register 434 may be a random access memory (RAM).

It is noted that, the loading of the first set of bits PW_M of the pulse data PW_DATA into the first counter 424 and the storing of the second set of bits PW_L of the pulse data PW_DATA into the register 434 according to the first load signal LD_1 is not required to be synchronous with the phase clock signal PH[0] which is used to counting. Instead, the first counter 424 may sent out the first load signal LD_1 immediately after it counts to 0 to load pulse data PW_DATA. In other words, the loading is asynchronous.

The MUX 432 is coupled to the register 434 and the phase enable circuit 422. The MUX 432 receives the selecting signal SEL and the phase signals PE[0]~PE[n] to select the first signal (not shown) from the phase signals PE[0]~PE[n] which are corresponding to the selecting signal SEL as the pulse width signal DP.

Figure 5:
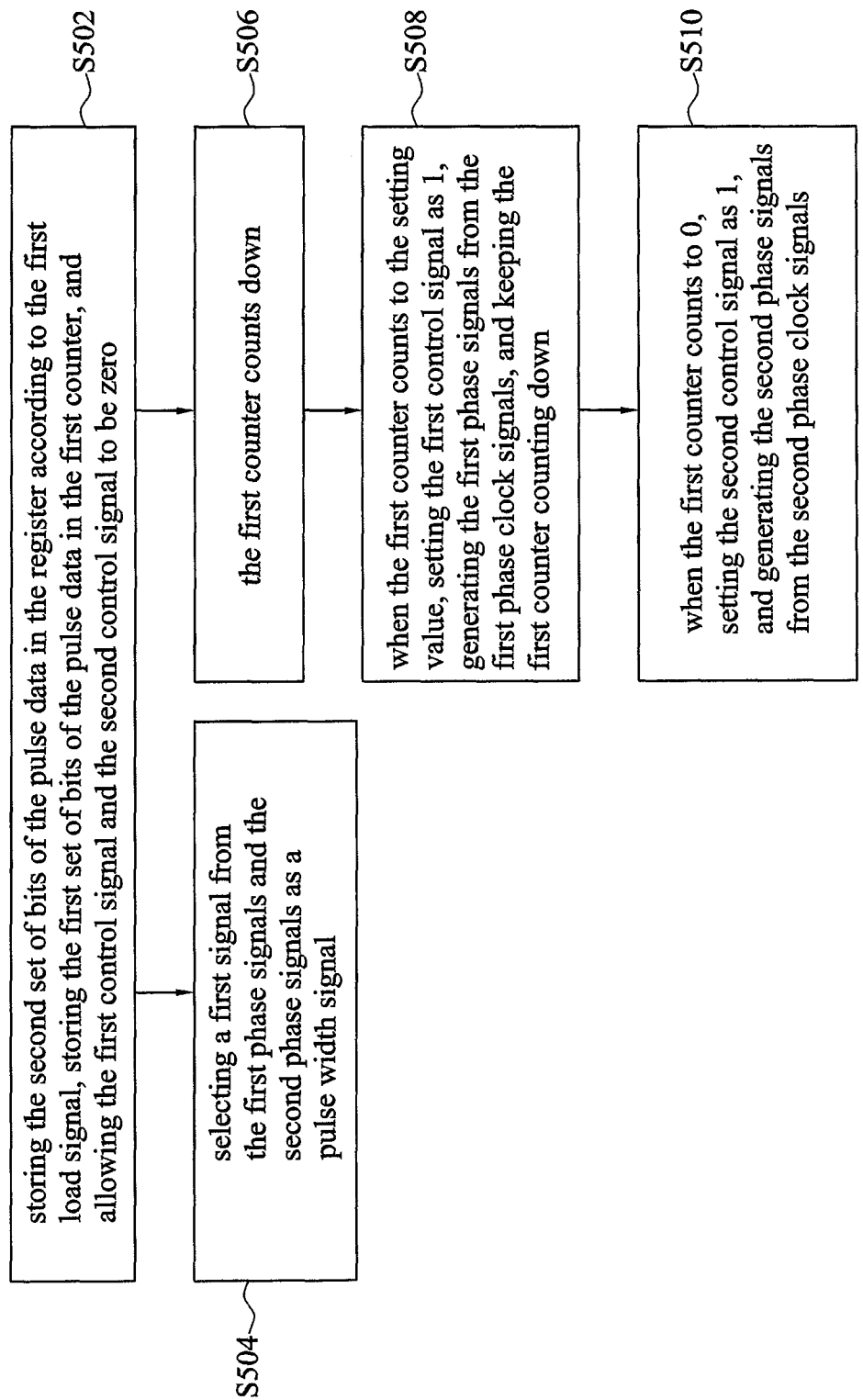
FIG. 5 is another flow chart showing the method for generating a digital pulse width in accordance with the disclosure.

FIG. 5 is another flow chart showing the method for generating a digital pulse width in accordance with the disclosure. Referring to FIG. 4 and FIG. 5, in step S502, the second set of bits PW_L of the pulse data PW_DATA are loaded to the register 434 and the first set of bits PW_M of the pulse data PW_DATA are loaded to the first counter 424 according to the first load signal LD_1. Thus, both the first control signal CTRL_1 and second control signal CTRL_2 are 0, so that the first phase signals PE[0]~PE[k] and the second phase signals PE[k+1]~PE[n] are the first logic value. At this time, it may be the start time of the first period and the start time of the interval described in FIG. 2.

In step S504, the register 434 outputs the selecting signal SEL to the MUX 432 to select the first signal from the first phase signals PE[0]~PE[k] and second phase signals PE[k+1]~PE[n] as the pulse width signal DP. In one embodiment, the selected first signal remains unchanged before the next loading. For example, the value of the second set of bits PW_L of the pulse data PW_DATA is 2, so that the value 2 is stored to the register 434 according to the first load signal LD_1, and the register 434 outputs the selecting signal SEL whose value is 2. The MUX 432 selects the phase signal PE[2] as the first signal and remains unchanged until the next loading. If the next loading is to store value 5 to the register 434 according to the first load signal LD_1, the phase signal PE[5] is selected to be the first signal and remains unchanged until the next loading.

In step S506, the first counter 424 counts down by the phase clock signal PH[0] according to the loaded value of the first set of bits PW_M. The value is subtracted by 1 for every clock cycle of the phase clock signal PH[0]. In step S508, when the first counter 424 counts to the setting value m, which may be the end time of the interval, the first counter 424 sets 1 to the first control signal CTRL_1 such that the first phase signals PE[0]~PE[k] are generated according to the first phase clock signals PH[0]~PH[k]. Then, the first counter 424 continues counting down. In step S510, when the first counter 424 counts to 0, which may be the end time of the first period, the first counter 424 set 1 to the second control signal CTRL_2 such that the second phase signals PE[k+1]~PE[n] are generated according to the second phase clock signals PH[k+1]~PH[n]. When there is a rising edge occurring in the phase signal which is corresponding to the first signal selected by the MUX 432, the pulse width signal DP transits to second logic value. For example, the MUX 432 selects the phase signal PE[2] as the pulse width signal DP. When there is a rising edge occurring in the phase clock signal PH[2], the pulse width signal DP is changed to the second logic value. In another embodiment, the pulse width signal DP is changed to the second logic value when there is a falling edge occurring in the phase signal which is corresponding to the first signal.

In another embodiment, after the interval (the first control signal CTRL_1 is enabled), the corresponding first phase signals PE[0]~PE[k] are changed from first logic value to second logic value with the rising edge of the first phase clock signals PH[0]~PH[k]. After the first period (the second control signal CTRL_2 is enabled), the corresponding second phase signals PE[k+1]~PE[n] are changed from the first logic value to the second logic value with the rising edge of the second phase clock signals PH[k+1]~PH[n]. Thus, when there is a rising edge occurring in the phase signal which is corresponding to the first signal selected by the MUX 432, the pulse width signal DP is changed to the second logic value. In another embodiment, after the interval, the corresponding first phase signals PE[0]~PE[k] are changed from the first logic value to the second logic value with the falling edge of the first phase clock signals PH[0]~PH[k]. After the first period, the corresponding second phase signals PE[k+1]~PE[n] are changed from the first logic value to the second logic value with the falling edge of the second phase clock signals PH[k+1]~PH[n]. Thus, when there is a falling edge occurring in the phase signal which is corresponding to the first signal selected by the MUX 432, the pulse width signal DP is changed to the second logic value.

Figure 6:
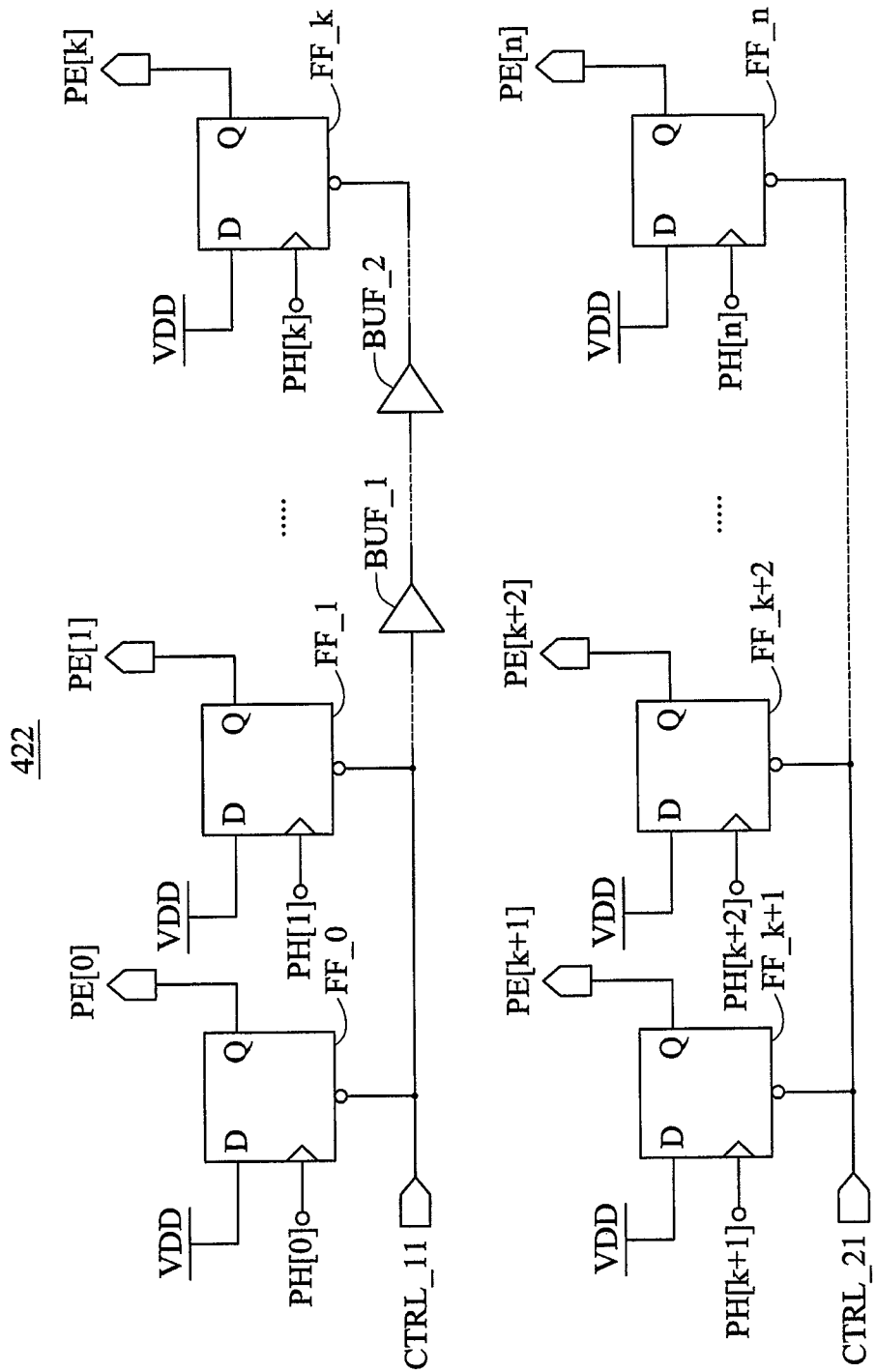
FIG. 6 is a circuit block diagram of the phase enable circuit in accordance with FIG. 4 of the disclosure.

FIG. 6 is a circuit block diagram of the phase enable circuit 422 in accordance with FIG. 4 of the disclosure. There are n flip-flops FF_0~FF_n in the phase enable circuit 422. The input ports D of the flip-flops FF_0~FF_n are coupled to the supply voltage VDD to provide logic high. The clock input ports of the flip-flops FF_0~FF_n are coupled to the phase clock signals PH[0]~PH[n] while the output ports Q of the flip-flops FF_0~FF_n are coupled to the phase signals PE[0]~PE[n]. The reset ports of the flip-flops FF_0~FF_k are coupled to the first enable control signal CTRL_11 while the reset ports of the flip-flops FF_k+1~FF_n are coupled to the second enable control signal CTRL_21. The first enable control signal CTRL_11 is the control signal which is generated by the first control signal CTRL_1, received by phase enable circuit 422, and synchronous with the phase clock signal PH[0]. Similarly, the second enable control signal CTRL_21 is the control signal which is generated by second control signal CTRL_2, received by phase enable circuit 422, and synchronous with the phase clock signal PH[0]. In an embodiment, buffers (for example, buffer BUF_1 and buffer BUF_2) may be inserted to adjust the time and the signal strength of the first enable control signal CTRL_11 and/or the second enable control signal CTRL_21 to the flip-flops.

In this embodiment, when the first enable control signal CTRL_11 is 0 (logic low), the first enable control signal CTRL_11 is disabled and the first phase signals PE[0]~PE[k] are reset to 0. When the first enable control signal CTRL_11 is 1 (logic high), the control signal CTRL_11 is enabled and the first phase signals PE[0]~PE[k] are generated according to the first phase clock signals PH[0]~PH[k]. For example, when the first enable control signal CTRL_11 is 0, the output port Q of the flip-flop FF_1 is 0 such that the phase signal PE[1] is 0. When the first enable control signal CTRL_11 is 1 and there is a rising edge occurring in the phase clock signal PH[1], the input port D of the flip-flop FF_1 is output to the output port Q such that the phase signal PE[1] is 1. Similarly, when the second enable control signal CTRL_21 is 0, the second enable control signal CTRL_21 is disabled and the second phase signals PE[k+1]~PE[n] are reset to 0. When the second enable control signal CTRL_21 is 1, the second enable control signal CTRL_21 is enabled and the first phase signals PE[k+1]~PE[n] are generated according to the second phase clock signals PH[k+1]~PH[n].

Figure 7:
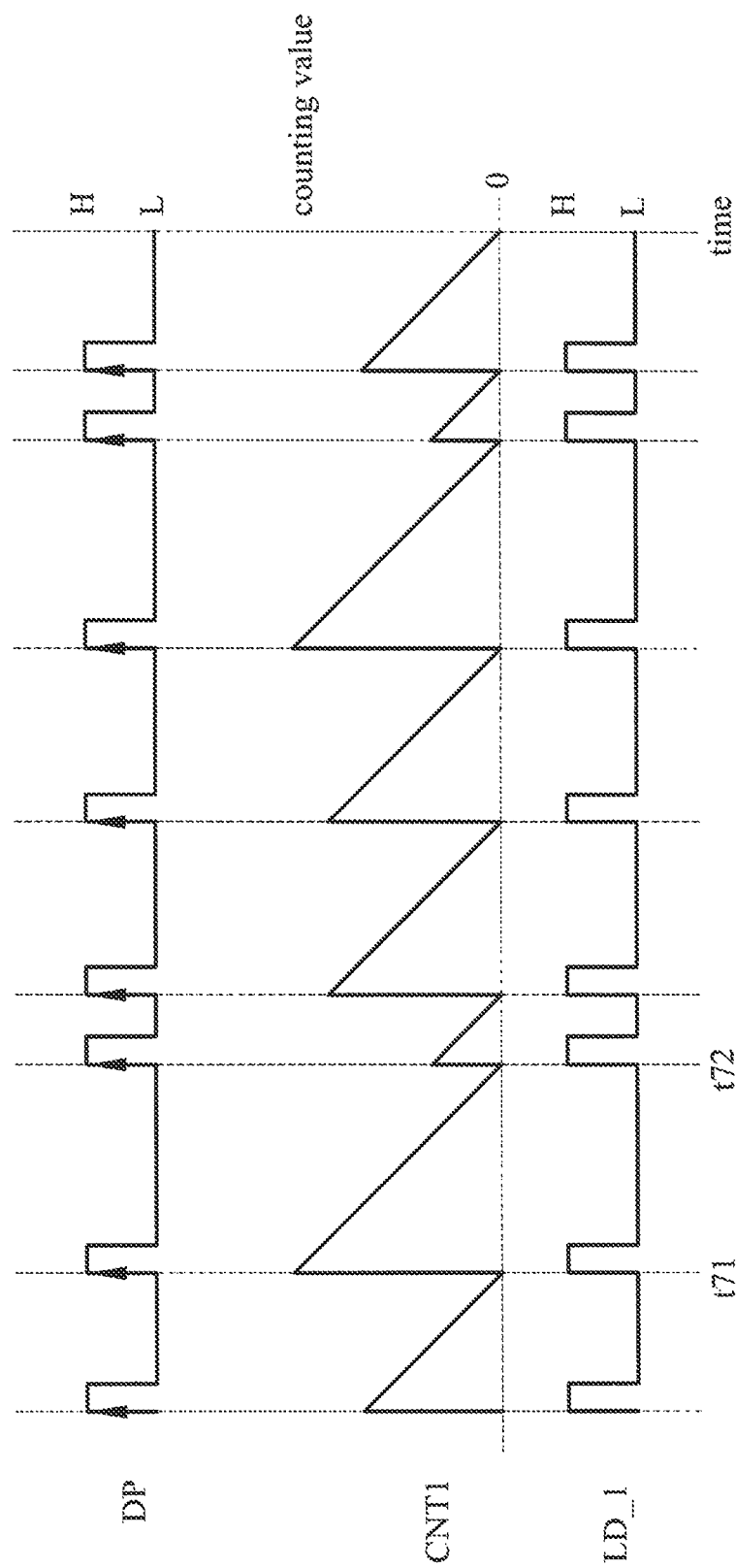
FIG. 7 is a signal waveform diagram of the digital pulse width generator in accordance with the disclosure.

FIG. 7 is a signal waveform diagram of the digital pulse width generator 400 in accordance with the disclosure. Referring to FIG. 4 and FIG. 7, the vertical axes of the pulse width signal DP and the first load signal LD_1 are logic level, for example, the voltage value or other electrical characteristics which may show logic 1 or logic 0. The first counting value CNT1 is the counting value of the first counter 424 and the vertical axis indicates the counting value. As shown in FIG. 7, the first counting value CNT1 is 0 at time t71, so the first counter 424 changes the first load signal LD_1 from 0 to 1 such that the first counter 424 loads in the first set of bits PW_M of the pulse data PW_DATA. A rising edge of the pulse width signal DP is generated according the first signal (not shown) of the phase signals PE[0]~PE[n]. The first counter 424 counts down after time t71. At time t72, the first counter 424 loads in the first set of bits PW_M again. Another rising edge of the pulse width signal DP is generated, and so on.

Figure 8:
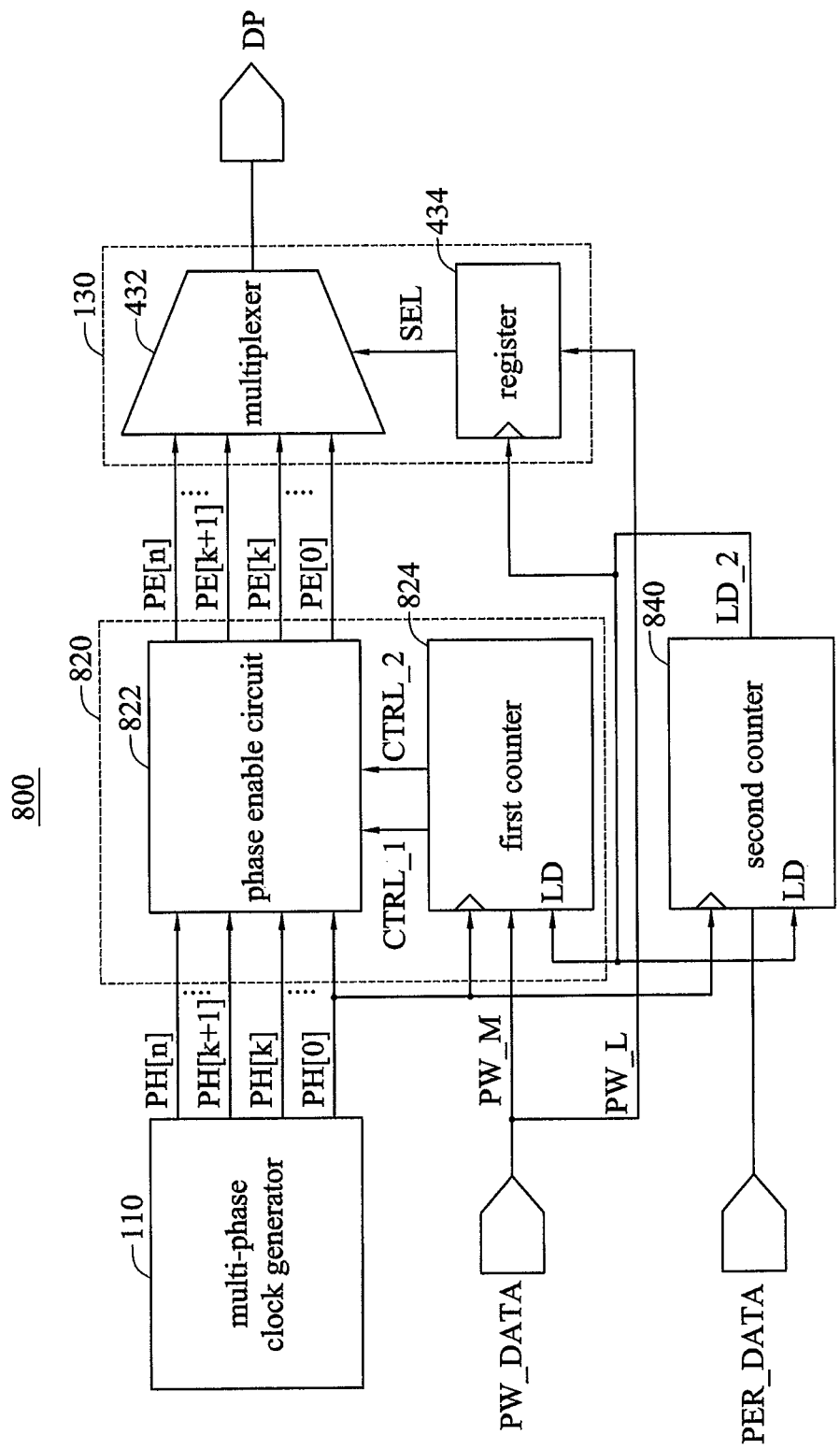
FIG. 8 is a circuit block diagram of the digital pulse width generator in accordance with another embodiment of the disclosure.

FIG. 8 is a circuit block diagram of the digital pulse width generator 800 in accordance with another embodiment of the disclosure. The digital pulse width generator 800 may be a digital pulse width modulator and the related description may be referred to the description of digital pulse width generator 400 in FIG. 4. The differences between the digital pulse width generator 800 and the digital pulse width generator 400 are described as follows. In the digital pulse width generator 800 shown in FIG. 8, a second counter 840 generates the second load signal LD_2 such that the first set of bits PW_M of the pulse data PW_DATA and the second set of bits PW_L are loaded into the first counter 824 and the register 434 respectively. The description of the multi-phase clock generator 110, the phase enable circuit 822, the first counter 824, the MUX 432, and the register 434 shown in FIG. 8 may also be referred to the description of the multi-phase clock generator 110, the phase enable circuit 422, the first counter 424, the MUX 432, and the register 434.

In this embodiment, the first counter 824 is not required to generate the first load signal LD_1. Alternatively, the first counter 824 may still generate the first load signal LD_1, but the generated first load signal LD_1 is not used as the load signal for pulse data PW_DATA to load into the first counter 824 and the register 434.

The second counter 840 is coupled to the multi-phase clock generator 110, the first counter 824, and the register 434. The phase clock signal PH[0] generated by the multi-phase clock generator 110 is input to the second counter 840 as the clock signal for counting. The second counter 840 loads in the period data PER_DATA according to the second load signal LD_2. Then the second counter 840 starts to count from period data PER_DATA according to the phase clock signal PH[0]. The counting value of the second counter 840 is subtracted by 1 until the counting value is 0. Then, the second counter 840 generates the second load signal LD_2 again to load the next period data PER_DATA into the second counter 840. The second load signal LD_2 is also output to the first counter 824 and the register 434 to load in the first set of bits PW_M of the pulse data PW_DATA and the second set of bits PW_L.

It is noted that the loading of the period data PER_DATA into the second counter 840, the loading of the first set of bits PW_M of the pulse data PW_DATA into the first counter 824, and the loading of the second set of bits PW_L of the pulse data PW_DATA into the register 434 according to the second load signal LD_2 are not required to be synchronous with the phase clock signal PH[0] which is used for counting. Instead, the second counter 840 may send out the second load signal LD_2 to load in the period data PER_DATA and the pulse data PW_DATA immediately after the second counter 840 counts to 0. In other words, the loading may be asynchronous.

In this embodiment, the second counter 840 counts down to 0 from the period data PER_DATA. However, the disclosure is not limited to this embodiment. In another embodiment, the second counter 840 may count up from 0 to the period data PER_DATA. The second counter 840 may also count up or down from a specific value to the period data PER_DATA plus or subtract another specific value. The second counter 840 may also count up or down from the period data PER_DATA plus or subtract a specific value to another specific value. In still another embodiment, the second counter 840 adds or subtracts i for every clock cycle, wherein i is a positive integer. It is noted that the clock signal for the second counter 840 to count is not required to be the phase clock signal PH[0]. The clock signal may be one of the phase clock signals PH[0]~PH[n] as long as it is the same with the clock signal for the first counter 824 to count.

In this embodiment, the first counter 824 and second counter 840 use the phase clock signal PH[0] to count. But the disclosure is not limited to this embodiment. The phase clock signal for the first counter 824 to count and the phase clock signal for the second counter 840 to count may be different. For example, the first counter 824 counts with the phase clock signal PH[1] while the second counter 840 counts with the phase clock signal PH[4].

Figure 9:
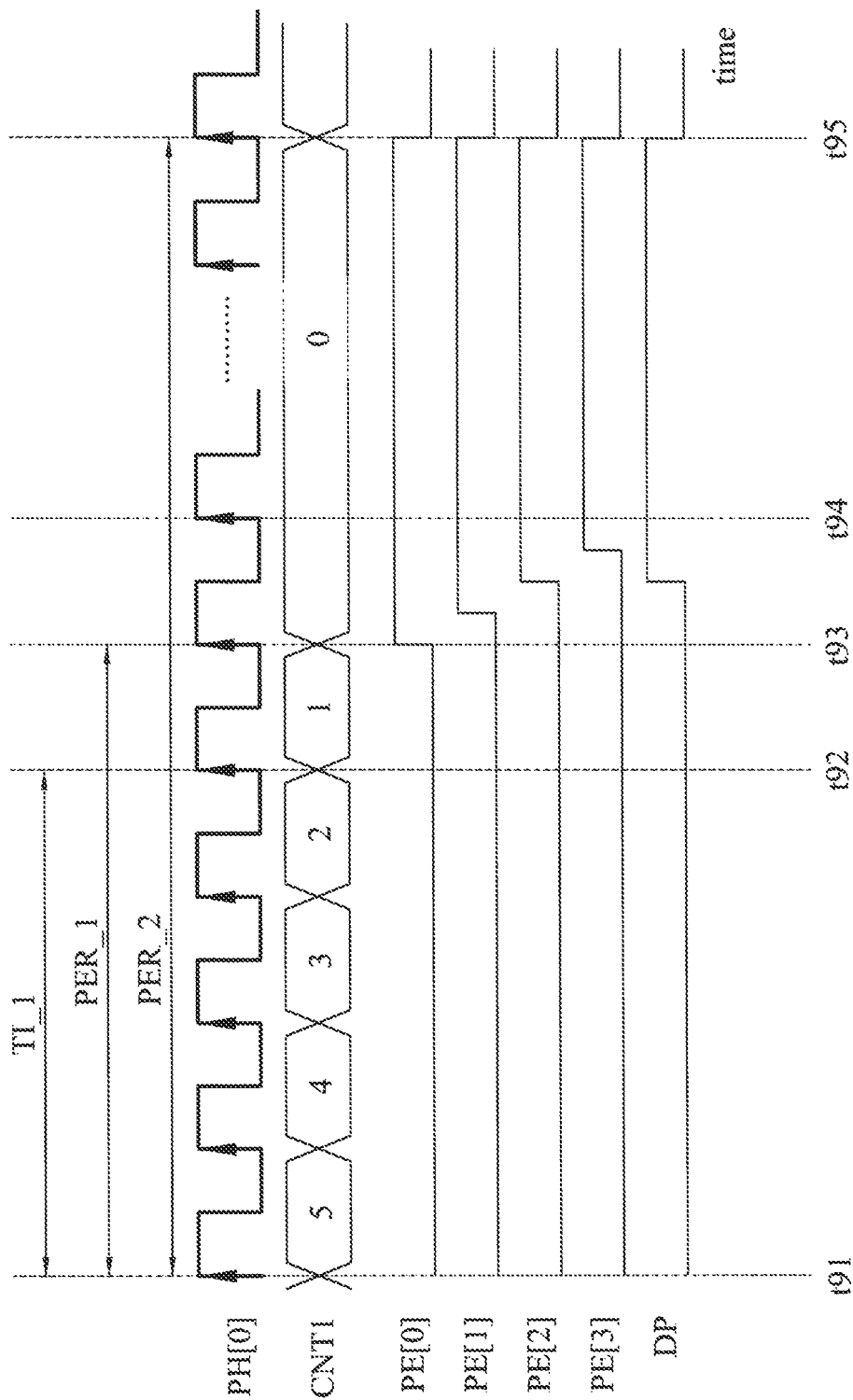
FIG. 9 is another signal waveform diagram of the digital pulse width generator in accordance with the disclosure.

FIG. 9 is another signal waveform diagram of the digital pulse width generator 800 in accordance with the disclosure. The description of the FIG. 9 may be also referred to the description of FIG. 6 and FIG. 8. In this embodiment, the value of the first set of bits PW_M of the pulse data PW_DATA is 5, the value of the second set of bits PW_L of the pulse data PW_DATA is 2, and n is 3 and k is 1 among the phase clock signals PH[0]~PH[n] and the phase signals PE[0]~PE[n]. Thus, the first phase clock signals PH[0]~PH[k] and the first phase signals PE[0]~PE[k] are first phase clock signals PH[0]~PH[1] and first phase signals PE[0]~PE[1], respectively while the second phase clock signals PH[k+1]~PH[n] and the second phase signals PE[k+1]~PE[n] are second phase clock signals PH[2]~PH[3] and second phase signals PE[3]~PE[3], respectively.

At time t91, after the period data PER_DATA (not shown), the value 5, and the value 2 are loaded into the second counter 840, the first counter 824, and the register 434, the second counter 840 and the first counter 824 start to count down. At this time, the phase signals PE[0]~PE[3] are set to logic 0. The MUX 432 selects the phase signal PE[2] as the pulse width signal DP, so that the pulse width signal DP is also logic 0. At time t92, the first counter 824 counts to 1. At this time, the first phase signals PE[0]~PE[1] are generated according to the first phase clock signals PH[0]~PH[1] in order. It is noted that although the first phase signals PE[0]~PE[1] are changed from logic 0 to logic 1 at and after time t93 as depicted in FIG. 9, the person having ordinary skill in the art, however, would know that because the first enable control signal CTRL_11 and the phase clock signal PH[0] are synchronous, the time that the reset port of the flip-flop FF_0 in FIG. 6 becomes logic 1 is later than the time t92, which is a rising edge of the phase clock signal[0], so that the time that the phase clock signal PH[0] influences the phase signal PE[0] is the rising edge at time t93. Similarly, due to high operation frequency, the precise phase clock signal, the buffer between the reset port of the flip-flop and the first enable control signal CTRL_11, or other reasons, the time that the phase clock signal PH[1] influences the phase signal PE[1] is later than time t93.

At time t93, the first counter 824 counts to 0. At this time, the second phase signals PE[2]~PE[3] are generated according to the second phase clock signals PH[2]~PH[3] in order. Because the second phase clock signal PH[2] is selected to be the pulse width signal DP, the pulse width signal DP is changed from logic 0 to logic 1 along with the change of the second phase clock signal PH[2] from logic 0 to logic 1. As long as the first counter 824 counts to 0, all of the phase signals PE[0]~PE[3] are changed from logic 0 to logic 1 before the next clock cycle comes, i.e., before time t94.

Then, the second counter 840 continues counting down to 0 which is time t95. At this time, the second counter 840 generates the second load signal LD_2 to load the next period data PER_DATA, the first set of bits PW_M of the pulse data PW_DATA, and the second set of bits PW_L of the pulse data PW_DATA, the phase signals PE[0]~PE[3] are set to 0, and the pulse width signal DP is changed from logic 1 to logic 0 accordingly.

In this embodiment, as shown in FIG. 9, TI_1 is the interval and PER_1 is the first period. At time t91, the first set of bits PW_M of the pulse data PW_DATA are loaded into the first counter 824, which is the start of the interval TI_1 and the first period PER_1. At time t92, the first counter 824 counts to 1, which is the end of the interval TI_1. At time t93, the first counter 824 counts to 0, which is the end of the first period PER_1. As shown in FIG. 9, the interval TI_1 ends earlier than the first period PER_1.

Figure 10:
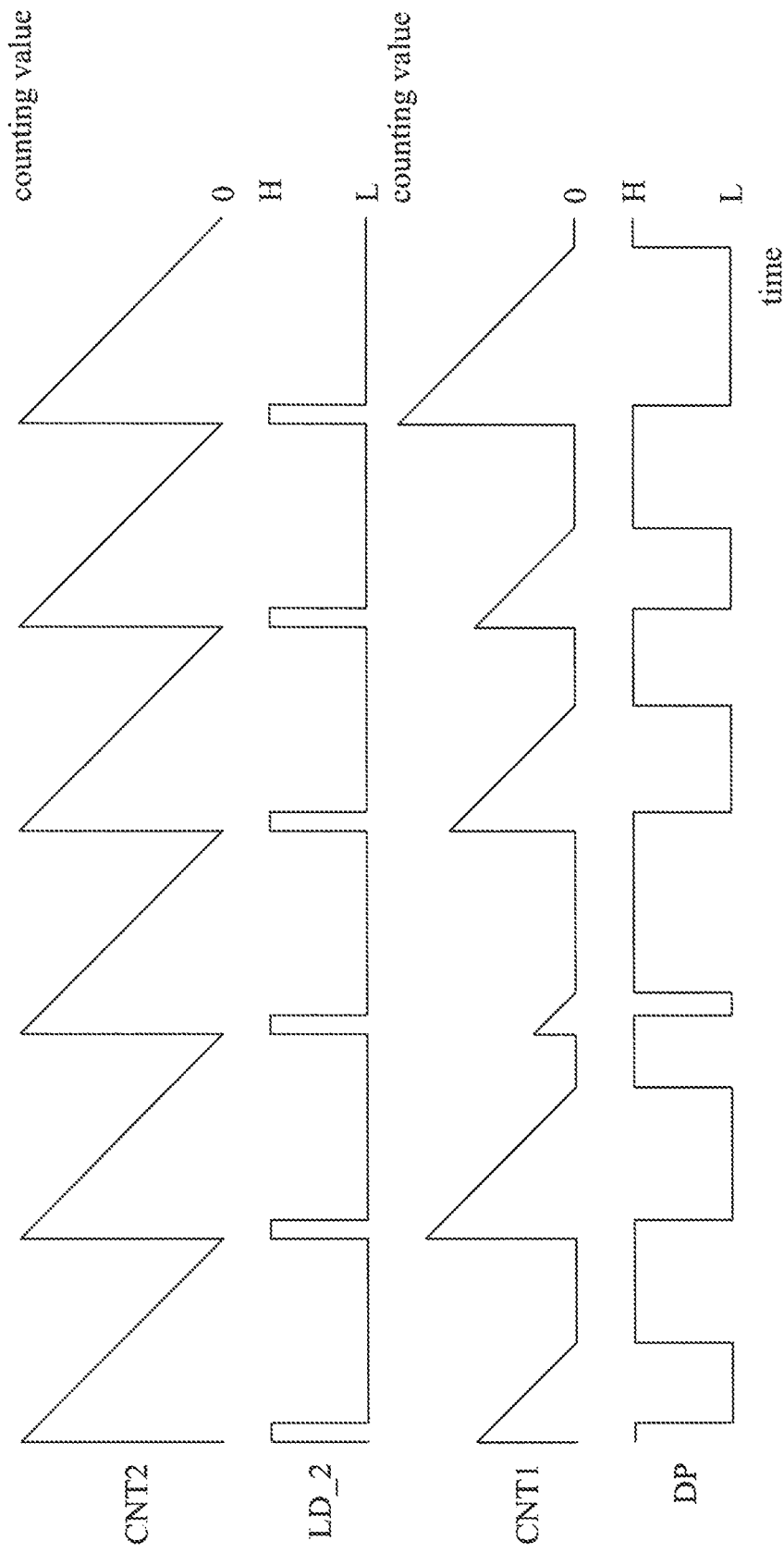
FIG. 10 is another signal waveform diagram of the digital pulse width generator in accordance with the disclosure.

FIG. 10 is another signal waveform diagram of the digital pulse width generator 800 in accordance with the disclosure. The description of FIG. 10 may be referred to the description of the FIG. 8. The vertical axes of the pulse width signal DP and the second load signal LD_2 are logic levels, for example, the voltage value or other electrical characteristics which may show logic 1 or logic 0. The counting value of the first counter 824 is the first count value CNT1 while the counting value of the second counter 840 is the second count value CNT2, wherein the vertical axes of the first count value CNT1 and the second count value CNT2 indicate counting values. As shown in FIG. 10, when the second counter 840 counts to 0, the second counter 840 generates the second load signal LD_2 such that the pulse width signal DP is logic 0. When the first counter 824 counts to 0, the pulse width signal DP is changed to logic 1 according to the selected phase signal (not shown) and keeps as logic 1 until the second counter 840 counts to 0. Then, when the second counter 840 counts to 0, the pulse width signal DP is changed to logic 0. In this way, the pulse width signal DP may include different pulse widths. Also the pulse width signal DP may include different duty cycles.

Figure 11:
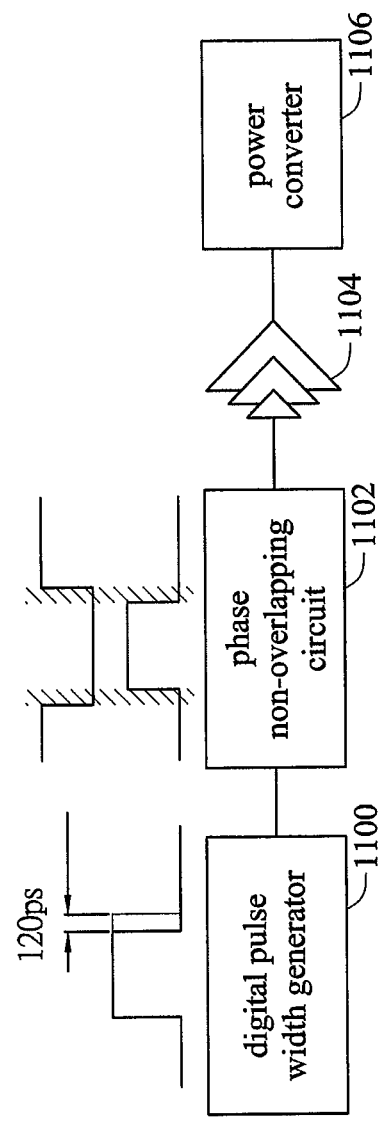
FIG. 11 is a test circuit block diagram of the digital pulse width generator in accordance with the disclosure.

FIG. 11 is a test circuit block diagram of the digital pulse width generator 1100 in accordance with the disclosure. As shown in the figure, the digital pulse width generator 1100 is coupled to a phase non-overlapping circuit 1102, a gate driver 1104 and a power converter 1106 in sequence. In this embodiment, the digital pulse width generator 1100 is a digital pulse width modulator. The number of the bits of the digital pulse width modulator in the test circuit is 13 bits. The operation frequency is 1 MHz, and the resolution is 120 ps (picosecond).

Figure 12A:
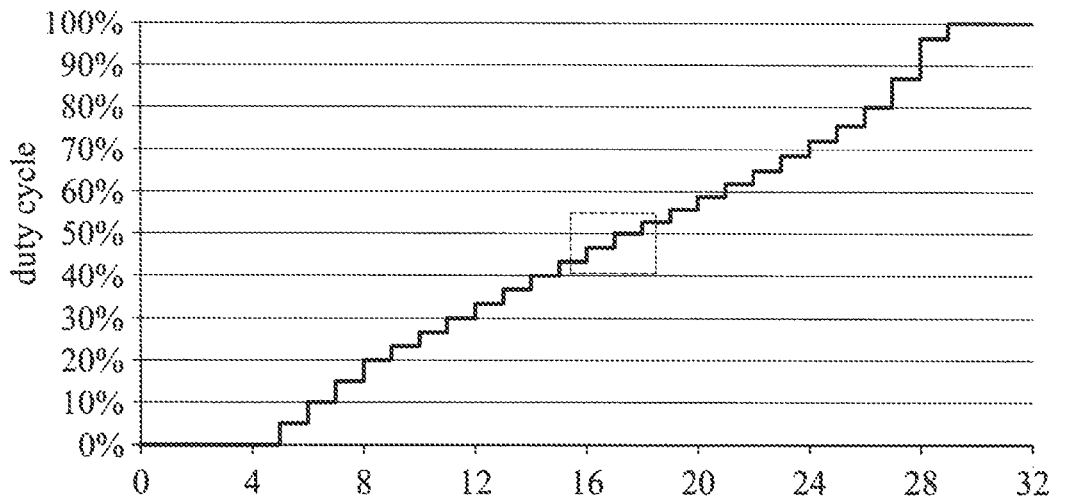
FIGS. 12A to 12C are measurement results of the digital pulse width generator in accordance with the disclosure.
Figure 12B:
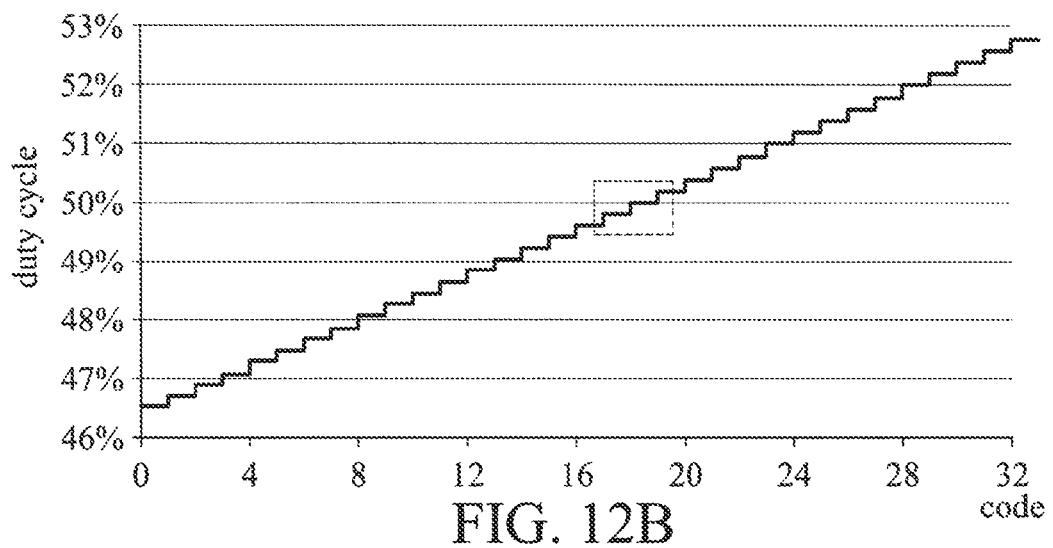
Figure 12C:
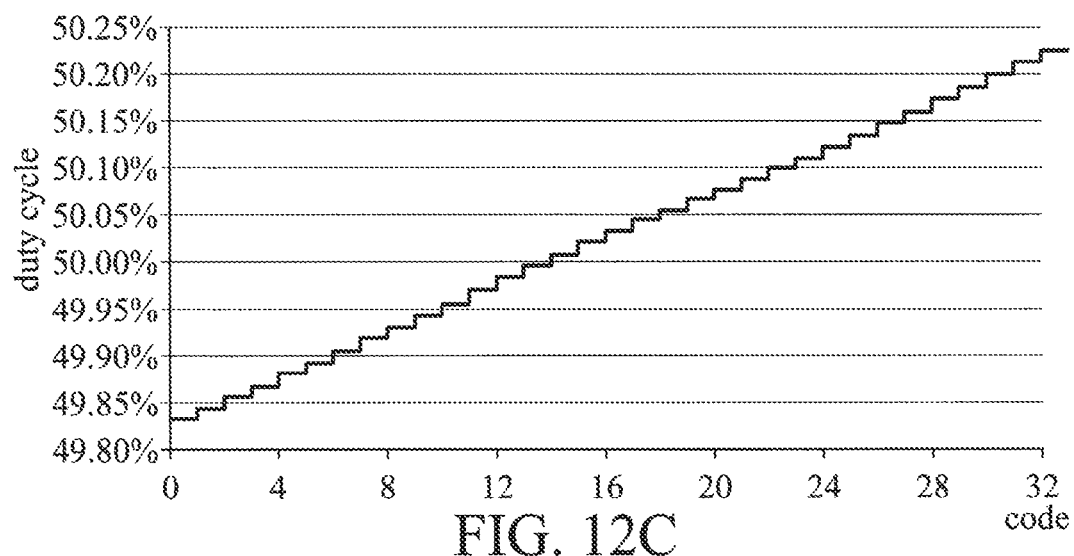

FIGS. 12A-12C show measurement results of the digital pulse width generator 1100 in accordance with the disclosure. Referring to FIGS. 12A-12C and FIG. 11, the digital pulse width generator 1100 is a 13-bit digital pulse width modulator. The 13 bits may be divided into a group of high bits b12~b8, a group of middle bits b8~b4, and a group of low bits b4~b0. FIG. 12A, FIG. 12B and FIG. 12C show the measurement results of the group of high bits b12~b8, the group of middle bits b8~b4, and the group of low bits b4~b0 respectively which indicate a coarse range, a middle range, and a fine range respectively. The horizontal axis is the code of each group while the vertical axis is the duty cycle. The measured differential nonlinearity (DNL) of the coarse range, middle range, and fine range are −0.059~0.148 LSB, −0.178~0.184 LSB, and −0.182~0.176 LSB respectively, while the integral nonlinearity (INL) are −0.549~0.026 LSB, −0.166~0.040 LSB, and −0.593~0.459 LSB respectively.

From the above description, the disclosure uses the multiphase clock generator to complete the least significant bits of the digital pulse width generator, and uses a counter to complete the most significant bits for every period. In addition, the logic control of the phase enable circuit is used to perform signal synchronization. Therefore, a digital pulse width generator with high resolution and high linearity is completed.

Although the disclosure is disclosed by the embodiments as described above. However, it is not to limit the disclosure. Any person having ordinary skill in the art may do modifications and variations without departing from the spirits or scope of the disclosure. Thus, it is intended that the scope of the disclosure is indicated by the following claims and their equivalents.

What is claimed is:

1. A method for generating a digital pulse width, comprising:
generating a first period according to a first set of bits of pulse data, wherein the first period comprises an interval, a plurality of first phase signals are set as a first logic value in the interval, the plurality of first phase signals are generated according to a plurality of first phase clock signals after an end of the interval, a plurality of second phase signals are set as the first logic value in the first period, the plurality of second phase signals are generated according to a plurality of second phase clock signals after an end of the first period, the interval starts at the same time with the first period, the interval ends earlier than the first period, and the plurality of first phase clock signals have different phases from the plurality of second phase clock signals; and
selecting a first signal from the plurality of first phase signals and the plurality of second phase signals according to a second set of bits of the pulse data as a pulse width signal, wherein the plurality of first phase signals and the plurality of second phase signals are inputted to a multiplexer, and the multiplexer selects the first signal according to an output value of a register.

2. The method of claim 1, further comprising:
loading the first set of bits of the pulse data to a first counter according to a load signal; and
loading the second set of bits of the pulse data to a register according to the load signal.

3. The method of claim 2, wherein generating the first period according to first set of bits of the pulse data further comprising:
counting down to a setting value by the first counter to generate the interval; and
counting down to zero by the first counter to generate the first period.

4. The method of claim 3, wherein the first counter counts according to a first clock signal of the plurality of first phase clock signals and the plurality of second phase clock signals, and the plurality of first phase signals and the plurality of second phase signals are changed from the first logic value to a second logic value according to the plurality of first phase clock signals and the plurality of second phase clock signals within a clock cycle after the first counter counts to zero.

5. The method of claim 3, further comprising:
generating the load signal when the first counter counts to zero.

6. The method of claim 3, further comprising:
loading period data to a second counter according to the load signal; and
generating the load signal when the second counter counts to zero.

7. The method of claim 1, wherein generating the first period according to the first set of bits of the pulse data further comprising:
changing the plurality of first phase signals corresponding to the plurality of first phase clock signals from the first logic value to a second logic value after the interval when the plurality of first phase clock signals have a rising edge or a falling edge; and
changing the plurality of second phase signals corresponding to the plurality of second phase clock signals from the first logic value to the second logic value after the first period when the plurality of second phase clock signals have a rising edge or a falling edge.

8. The method of claim 1, wherein the pulse data comprise a group of most significant bits (MSB) and a group of least significant bits (LSB), the first set of bits of the pulse data is one of the group of MSB and the group of LSB, and the second set of bits of the pulse data is the other one of the group of MSB and the group of LSB.

9. A digital pulse width generator, comprising:
a phase control circuit for receiving a first set of bits of pulse data to generate a first period, a plurality of first phase signals, and a plurality of second phase signals, wherein the first period comprises an interval, the plurality of first phase signals are set to a first logic value in the interval, the plurality of first phase signals are generated according to a plurality of first phase clock signals after an end of the interval, the plurality of second phase signals are set to the first logic value in the first period, the plurality of second phase signals are generated according to a plurality of second phase clock signals after an end of the first period, the interval starts at the same time with the first period, the interval ends earlier than the first period, and the plurality of first phase clock signals have different phases from the plurality of second phase clock signals; and
a phase select circuit coupled to the phase control circuit for receiving the plurality of first phase signals, the plurality of second phase signals, and second set of bits of the pulse data to select a first signal from the plurality of first phase signals and the plurality of second phase signals according to the second set of bits of the pulse data as a pulse width signal, wherein the phase select circuit comprises a multiplexer and a register, and the multiplexer receives the plurality of first phase signals and the plurality of second phase signals and selects the first signal according to an output value of the register.

10. A digital pulse width generator, comprising:
a phase control circuit for receiving a first set of bits of pulse data to generate a first period, a plurality of first phase signals, and a plurality of second phase signals, wherein the first period comprises an interval, the plurality of first phase signals are set to a first logic value in the interval, the plurality of first phase signals are generated according to a plurality of first phase clock signals after an end of the interval, the plurality of second phase signals are set to the first logic value in the first period, the plurality of second phase signals are generated according to a plurality of second phase clock signals after an end of the first period, the interval starts at the same time with the first period, the interval ends earlier than the first period, and the plurality of first phase clock signals have different phases from the plurality of second phase clock signals; and
a phase select circuit coupled to the phase control circuit for receiving the plurality of first phase signals, the plurality of second phase signals, and second set of bits of the pulse data to select a first signal from the plurality of first phase signals and the plurality of second phase signals according to the second set of bits of the phase data as a pulse width signal,
wherein the phase control circuit receives a load signal to load the first set of bits of the pulse data to the phase control circuit, and the phase select circuit receives the load signal to load the second set of bits of the pulse data to the phase select circuit.

11. The digital pulse width generator of claim 10, further comprising:
a multi-phase clock generator generating the clock signals with different phases, wherein the clock signals comprise the plurality of first phase clock signals and the plurality of second phase clock signals.

12. The digital pulse width generator of claim 11, wherein the phase control circuit comprises:
a first counter for receiving the load signal and outputting a first control signal and a second control signal, wherein a logic value of the first control signal is changed when the first counter counts to the end of the interval, and a logic value of the second control signal is changed when the first counter counts to the end of the first period; and
a phase enable circuit coupled to the multi-phase clock generator, the first counter, and the phase select circuit for receiving the plurality of first phase clock signals, the plurality of second phase clock signals, the first control signal, and the second control signal, and for generating the plurality of first phase signals and the plurality of second phase signals.

13. The digital pulse width generator of claim 12, wherein the first counter loads the first set of bits of the pulse data to the first counter according to the load signal for disabling the first control signal and the second control signal and counting down, the first counter enables the first control signal when the first counter counts to a setting value, and the first counter enables the second control signal when the first counter counts to zero.

14. The digital pulse width generator of claim 12, wherein the phase enable circuit comprises:
a plurality of first flip-flops for receiving the first control signal and the plurality of first phase clock signals, wherein reset ports of the first flip-flops are coupled to each other and receive the first control signal, and clock ports of the first flip-flops receive the plurality of first phase clock signals correspondingly; and
a plurality of second flip-flops for receiving the second control signal and the plurality of second phase clock signals, wherein reset ports of the second flip-flops are coupled to each other and receives the second control signal, and clock ports of the second flip-flops receive the plurality of second phase clock signals correspondingly.

15. The digital pulse width generator of claim 12, wherein the phase enable circuit sets the plurality of first phase signals as the first logic value when the first control signal is disabled, the plurality of first phase signals are changed from the first logic value to a second logic value correspondingly when the first control signal is enabled and the plurality of first phase clock signals have a rising edge or a falling edge, the phase enable circuit sets the plurality of second phase signals as the first logic value when the second control signal is disabled, and the plurality of second phase signals are changed from the first logic value to the second logic value correspondingly when the second control signal is enabled and the plurality of second phase clock signals have a rising edge or a falling edge.

16. The digital pulse width generator of claim 12, wherein the first counter generates the load signal when the first counter counts to zero.

17. The digital pulse width generator of claim 12, further comprising:
a second counter coupled to the first counter and the phase select circuit for receiving the load signal, loading period data to the second counter according to the load signal, counting down, and generating the load signal when the second counter counts to zero.

18. The digital pulse width generator of claim 17, wherein the first counter and the second counter count according to different phase clock signals of the clock signals.

19. The digital pulse width generator of claim 11, wherein the multi-phase clock generator comprises a ring oscillator.

20. The digital pulse width generator of claim 10, wherein the phase select circuit comprises:
a register for receiving the load signal to store the first set of bits of the pulse data; and
a multiplexer coupled to an output port of the register for receiving the plurality of first phase signals and the plurality of second phase signals, and selecting the first signal according to an output value of the register.

* * * * *